United States Patent [19]
Allardice, Jr.

[11] 3,983,429
[45] Sept. 28, 1976

[54] ADJUSTABLE MOTOR BASE

[75] Inventor: William D. Allardice, Jr., Pittsburgh, Pa.

[73] Assignee: Westinghouse Electric Corporation, Pittsburgh, Pa.

[22] Filed: May 8, 1975

[21] Appl. No.: 575,889

[52] U.S. Cl. ................................................. 310/91
[51] Int. Cl.² ...................................... H02K 5/00
[58] Field of Search .................. 310/85, 89, 91, 66, 310/42, 1, 90, 40 MM, 273; 248/23, 16; 317/99, 101 CB, 101 DH

[56] References Cited
UNITED STATES PATENTS

| | | | |
|---|---|---|---|
| 2,151,561 | 3/1939 | Morrill | 310/91 |
| 3,066,898 | 12/1962 | Haynes | 248/23 |
| 3,306,601 | 2/1967 | Mitchell | 248/16 |
| 3,509,391 | 4/1970 | Pfeuffer | 310/91 |

FOREIGN PATENTS OR APPLICATIONS

| | | | |
|---|---|---|---|
| 213,051 | 6/1955 | Australia | 310/91 |
| 514,035 | 6/1955 | Canada | 248/16 |

*Primary Examiner*—R. Skudy
*Attorney, Agent, or Firm*—G. H. Telfer

[57] ABSTRACT

An adjustable motor mount has two interlocking base plates and turned-up yokes which are attachable to axially projecting end bell hub portions of a motor. The interlocking base plates are slidably engaged one to another and may be axially adjusted to accommodate motors of different axial lengths. The axial expansion feature of the invention may also be used in conjunction with motors having dual hub mounting portions to provide either rigid or resilient support.

7 Claims, 13 Drawing Figures

ADJUSTABLE MOTOR BASE

BACKGROUND OF THE INVENTION

1. Field of the Invention

This invention relates to supporting structure for rotating machinery and more particularly to an axially adjustable mounting base which can accommodate machines of different frame sizes and which can be used in either rigid or resilient mounting arrangements.

2. Description of the Prior Art

Small rotating machines such as fractional horsepower electric motors may be either rigidly or resiliently mounted. In conventional construction, rigidly mounted motors have a unitary base plate which is rigidly attached by spot welding to the motor housing in a base-mounting arrangement. On the other hand, resiliently mounted motors are usually provided with resilient mounting rings which are disposed around projecting hub portions of the motor housing and are clamped to supporting yoke portions of a unitary base plate in an end-attachment mounting arrangement. These commonly known mounting arrangements are quite different from each other, and conversion of a motor from one type of mounting to another is not a common practice; such a conversion would require substantial structural modification of the motor housing and base plate. It is frequently desirable, however, to mount a motor either rigidly or resiliently on the same base, depending upon the purpose for which the motor is to be used, without resorting to structural changes.

Additionally, it is sometimes desirable to replace an existing motor with a new motor which may be longer or shorter in axial length than the existing motor. It would be convenient and economical to mount the new motor on the existing mounting plate without making structural changes to either the mounting plate or to the new housing. This situation may arise, for example, when horsepower requirements increase and a longer, more powerful motor must be substituted for an existing motor. It is, therefore, a principal object of the present invention to provide a universal mounting structure which may be adjusted to accommodate machines of different axial lengths and which may be used in conjunction with machines having dual hub mounting portions to provide either rigid or resilient support.

SUMMARY OF THE INVENTION

In accordance with the present invention, a mounting base structure is provided which is axially adjustable to accommodate machines of different axial lengths. The invention provides a cradle shaped mounting structure which has two interlocking base plates and turned-up yokes which are attachable to end bell hub portions of a motor. The base plates are slidably engaged one to another in a telescoping arrangement which includes overlapping shoulder portions and a centrally disposed tongue portion which is engaged in sliding contact with oppositely disposed channel members. The axial extension of the interlocking base plates is adjusted by sliding the base plates inwardly or outwardly as required. Suitable fastening means are provided for joining the shoulder portions in a fixed position after the proper axial length is obtained.

The cradle shaped mounting structure of the present invention is well adapted for end attachment to machines which have axially projecting hub mounting portions. In particular, the axial expansion feature may be used in conjunction with machines having dual hub mounting portions to provide either resilient or rigid support. The base plates are expanded or contracted, according to the type of mounting desired, to position the yokes in axial alignment with concentric, axially projecting hub mounting portions, one portion of each hub having a polygonal periphery suitable for mounting with a conventional resilient ring and the other having a generally circular periphery suitable for rigidly mounting the yoke directly to the hub. Suitable fastening means are provided for securing the yokes to the hub mounting structure.

BRIEF DESCRIPTION OF THE DRAWING

The invention will be more fully understood from the following detailed description, taken in connection with the accompanying drawing, in which.

DESCRIPTION OF THE PREFERRED EMBODIMENT

Figure 1:
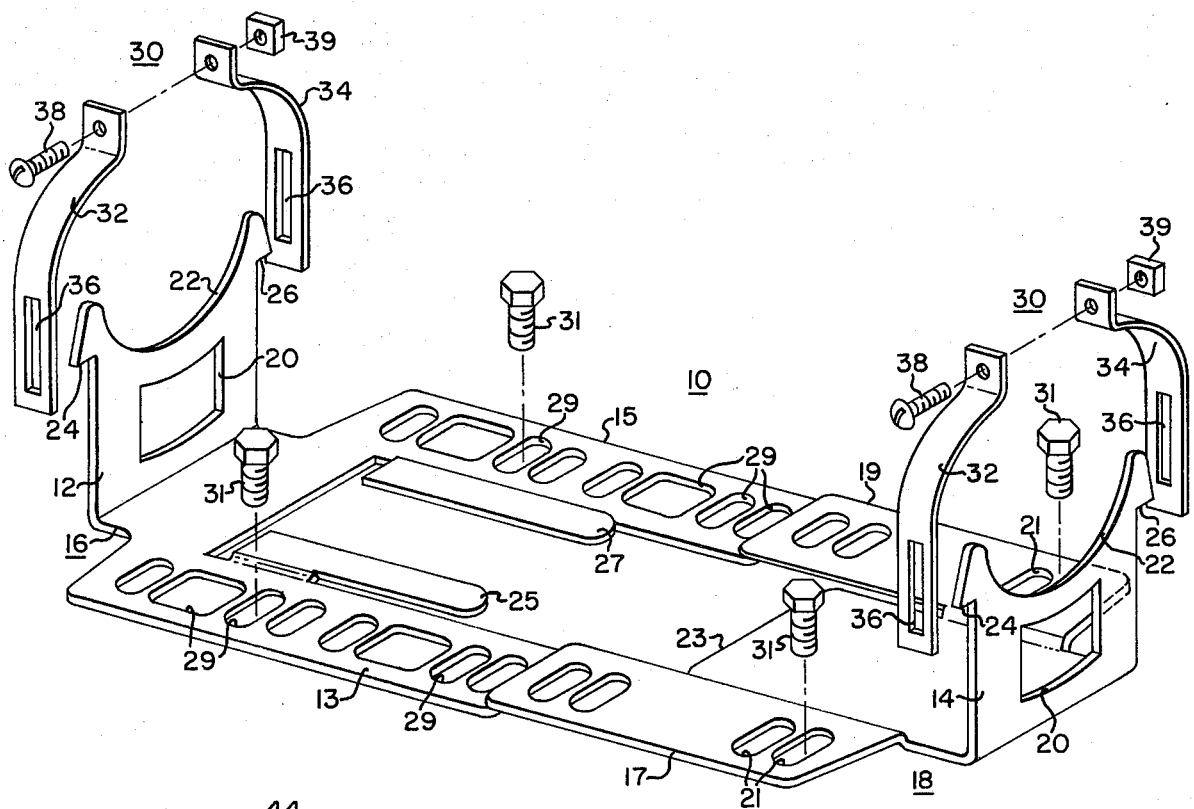
FIG. 1 is an exploded view of a preferred embodiment of the invention.

Throughout the description which follows, like reference characters refer to like elements on all figures of the drawing.

One structure embodying the present invention is illustrated in FIG. 1 of the drawing. In FIG. 1, a cradle shaped, two-piece of adjustable mounting base 10 comprises vertical supporting yokes 12, 14 and base plate members 16 and 18. The yokes 12, 14 project perpendicularly from the base plate members 16, 18 and are formed with a centrally disposed ventilating recess 20 and a curved supporting lip 22. Each lip 22 is terminated on either side by clamp anchoring posts 24 and 26. The yokes 12, 14 are preferably integrally formed with the base plate members 16, 18 and may be stamped from a single sheet of sheet metal stock of any suitable thickness. Structural features of the base plate members and yokes are shown in greater detail in FIGS. 4, 5, 6 and 7.

Above each yoke is a clamp 30 comprising arcuate fastening straps 32, 34. Centrally disposed near the lower ends of the straps 32, 34 are slots 36 for engaging the anchoring posts 24, 26. A screw 38 projects through suitable openings in the straps 32 and 34 and is engaged with a nut 39 which is provided to draw the straps 32, 34 together and force the clamp 30 into compressive engagement with an end bell hub mounting portion in a manner to be described in detail hereinafter.

The adjustable base plate design of the present invention includes the base plates 16 and 18 which are adapted for sliding engagement with each other in an overlapping, interlocking arrangement as illustrated in FIG. 1. The base plate member 18 comprises two spaced shoulder portions 17 and 19 which have a plurality of slots 21 for receiving securing means which lock the base plates 16 and 18 together and rigidly attach the interlocked base plates to a foundation (not shown). Disposed between and immediately below the shoulder portions 17 and 19 is a flat tongue portion 23 which extends at right angles from the yoke 14. The tongue portion 23 engages the channel members 25 and 27 of the base plate 16 in sliding contact when the shoulder portions 17 and 19 of the base plate 18 are placed in overlapping relationship with the corresponding shoulder portions 13, 15 of the base plate 16.

The base plate member 16 comprises two spaced shoulder portions 13 and 15 which are similar to the shoulder portions 17, 19 of the base plate member 18 and which also have a plurality of axially disposed slots 29. When the shoulders of the base plate members 16 and 18 are positioned in an overlapping arrangement, the slots 21, 29 of the adjacent shoulder portions are superimposed in concentric alignment one to another for receiving securing means, such as a lock bolt 31, so that the base plates 16 and 18 may be held in a fixed position.

The axial extension of the base plate members 16, 18 is adjusted to accommodate motors of different axial lengths of sliding the base plates 16 and 18 inwardly or outwardly as required. The telescoping mounting plates 16, 18 are held in axial alignment by means of the channel members 25 and 27 which are engaged in sliding contact with the tongue portion 23. The interlocked shoulders and the tongue and channel combination cooperate to prevent radial displacement of one plate member with respect to the other. Inadvertent axial displacement of the mounting plates 16, 18 is prevented by locking the shoulder portions of adjacent mounting plates together, for example, by means of the locking bolts 31.

Figure 2:
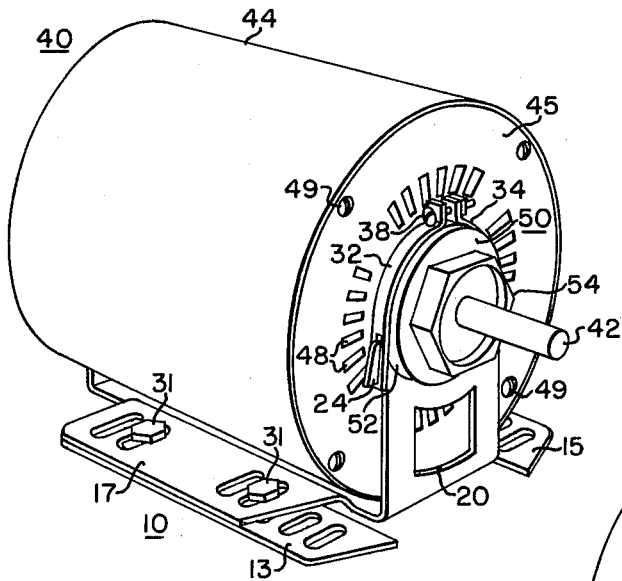
FIG. 2 is a perspective view of an electric motor supported by the preferred embodiment in a rigid mounting arrangement.

Referring now to FIG. 2, the invention is shown in a rigid mounting arrangement. The invention is generally applicable to any rotating machine, and is shown in FIG. 2 rigidly attached to a small electric motor 40 having a rotor member (not shown) to which a shaft 42 is attached, a stator member (not shown), and a housing 44. The shaft 42 is supported within the housing 44 by conventional means such as bearings (not shown). The bearings are located within projecting hub mounting portions 52, 54 of an end bell 50 at either end of the housing 44.

Figure 9:
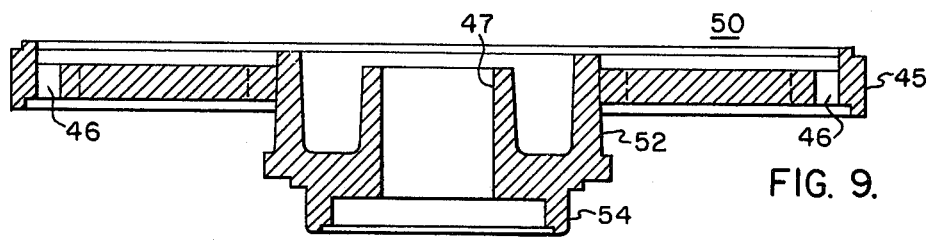
FIG. 9 is a sectional view of the end bell of FIG. 8 taken along the line IX—IX.
Figure 10:
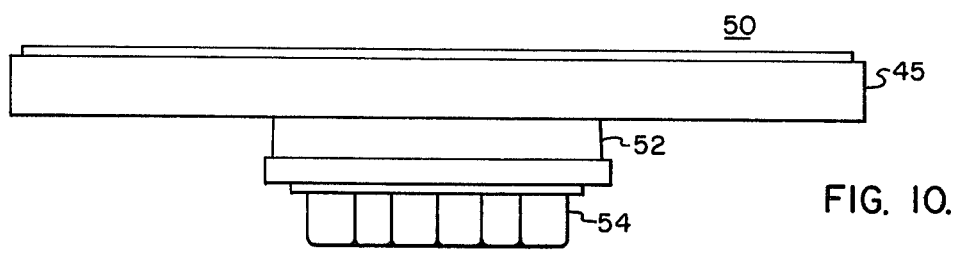
FIG. 10 is a side elevation view of the end bell of FIG. 8.
Figure 8:
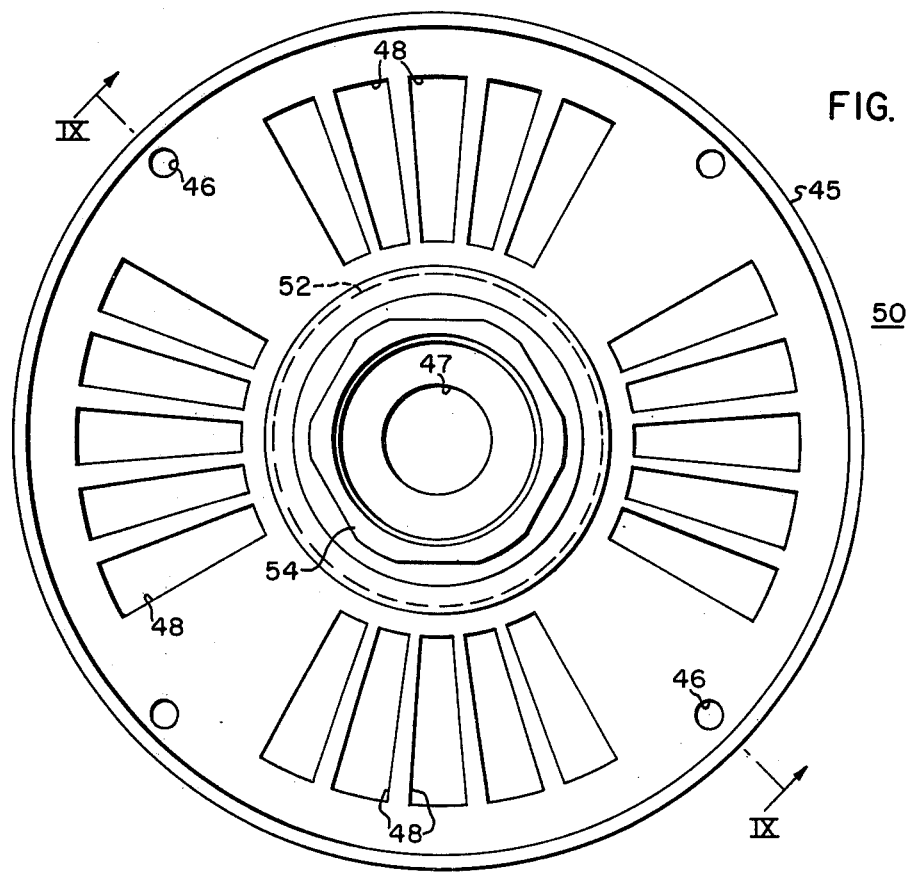
FIG. 8 is an elevation view of an end bell having dual hub mounting portions.

The end bell 50 illustrated in FIG. 8, 9 and 10 comprises generally a disc 45 of metal having an opening 47 for receiving the shaft 42. The dual hub mounting portions 52 and 54 project axially away from the surface of the disc 45 as shown in FIGS. 2, 3, 9, and 10. The disc 45 may have a plurality of radially arranged slots 48 for ventilation, and a plurality of openings 46 for receiving through bolts 49 for fastening the end bell 50 to the housing 44 in a conventional manner.

The outer periphery of the hub mounting portion 52 is preferably circular, but other curved surface arrangements may be utilized to good advantage. The outer surfaces of the hub mounting portion 54 may be hexagonal, as shown in FIG. 8, although other polygonal, circular, or irregular configurations may be used if desired. The hexagonal hub mounting portion 54 has a greater axial projection with respect to the surface of the disc 45 and has a smaller diameter as compared with the axial projection and diameter of the circular hub mounting portion 52.

The motor 40 is rigidly supported on the adjustable mounting base 10 by means of the arcuate fastening straps 32, 34 which hold the circular hub mounting portion 52 in compressive engagement with the curved supporting lips 22 of the yokes 12, 14. The fastening straps 32, 34 are anchored to the yokes 12, 14 by means of the slots 36 which engage a tang portion of each anchor post 24, 26. It will be seen that when the fastening straps 32, 34 are tightened, the yoke, circular hub mounting portion, and clamp are rigidly joined together. The overlapping shoulder portions 13, 17 and 15, 19 may then be secured together and attached to a foundation (not shown) by suitable fastening means such as the lock bolts 31.

Figure 3:
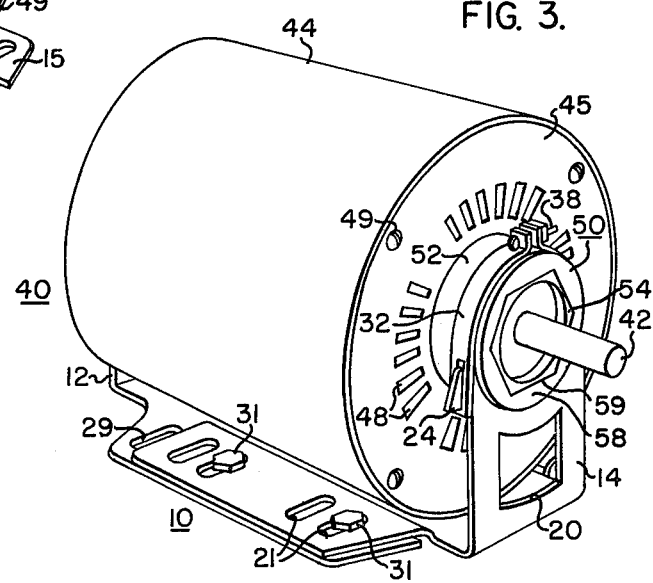
FIG. 3 is a perspective view of an electric motor supported in a resilient mounting arrangement.
Figure 4:
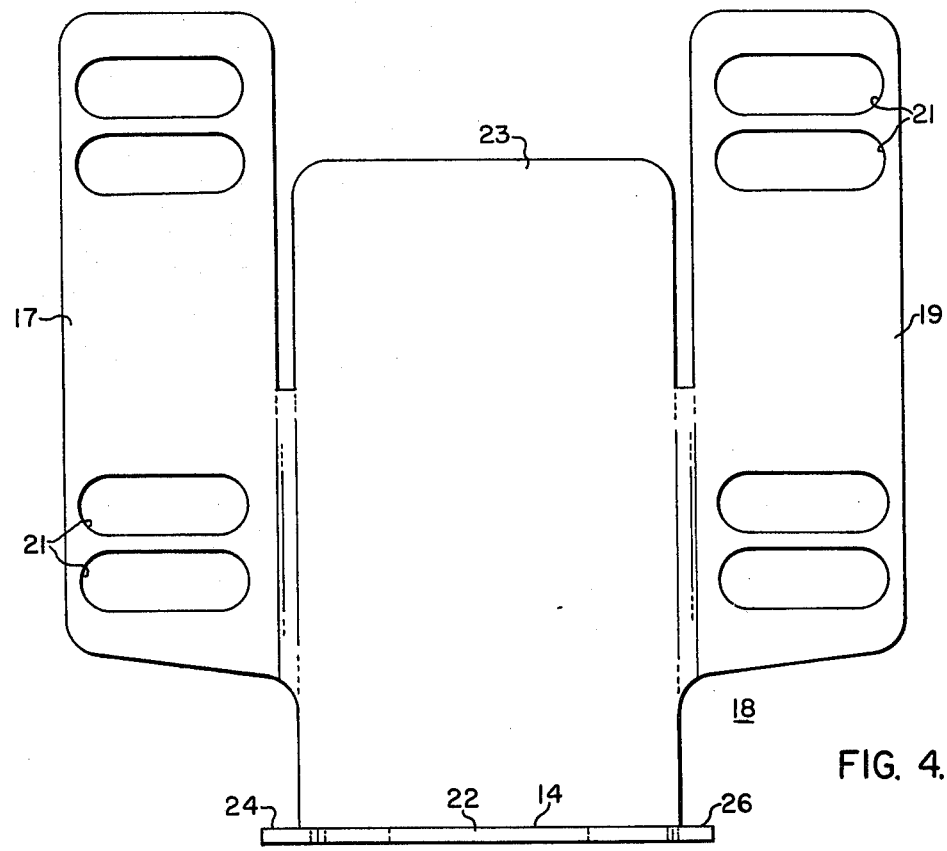
FIG. 4 is a top view of a base plate member of the preferred embodiment.
Figure 5:
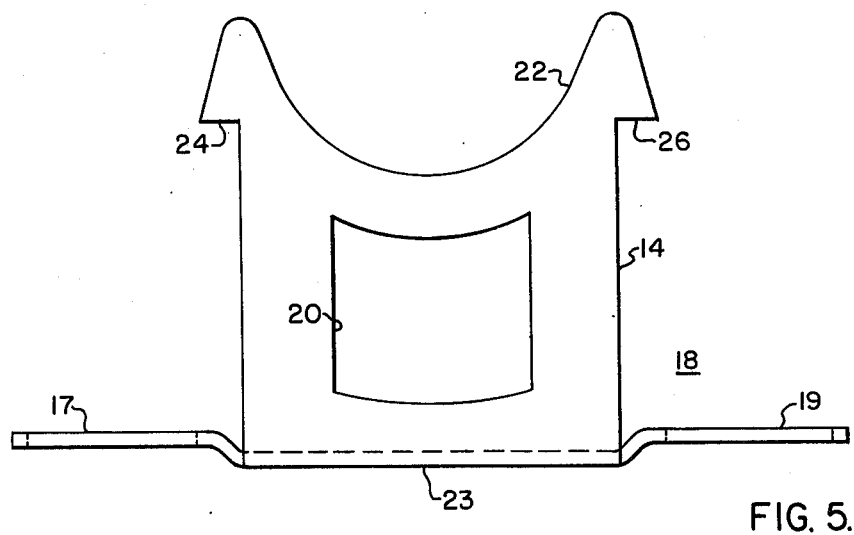
FIG. 5 is an end view of the base plate member of FIG. 4.
Figure 6:
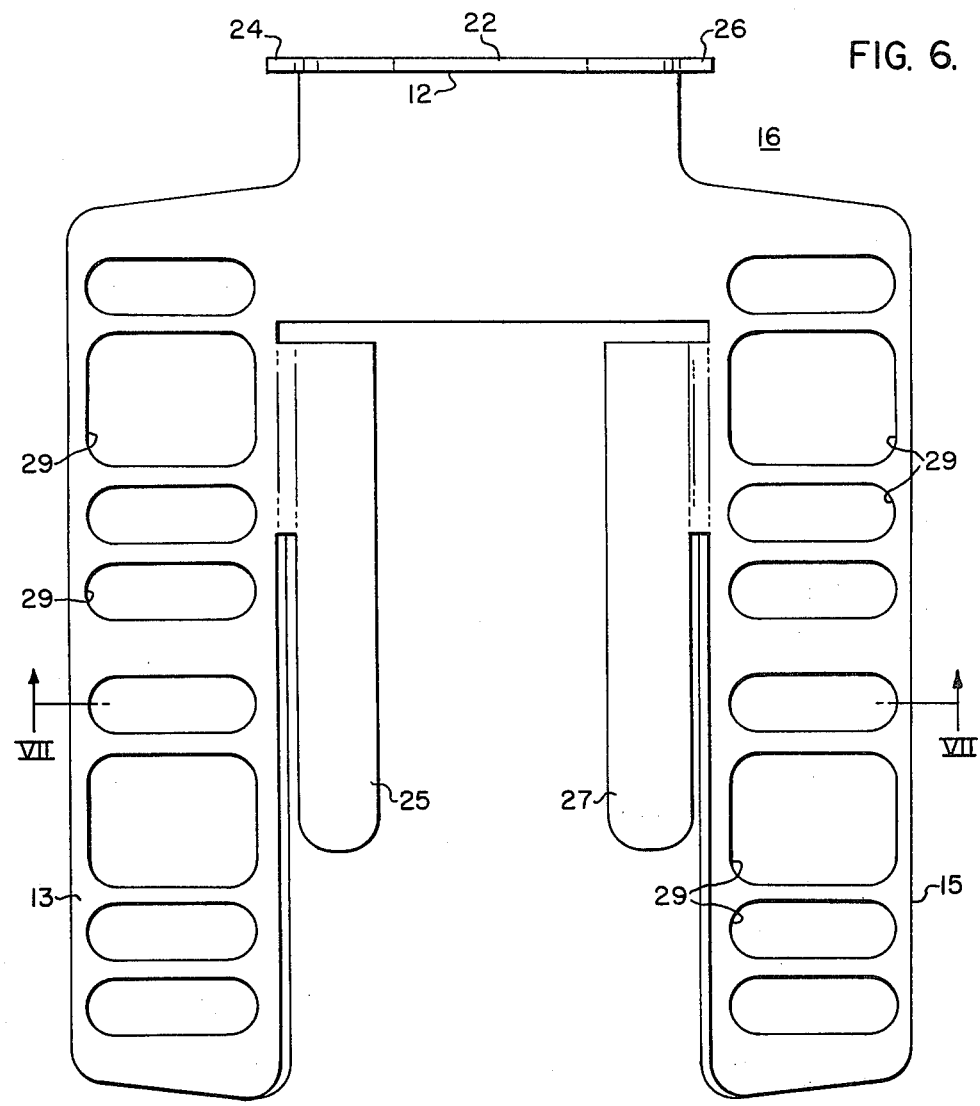
FIG. 6 is a top view of a base plate member which is adapted for sliding engagement with the base plate member of FIG. 4.
Figure 7:
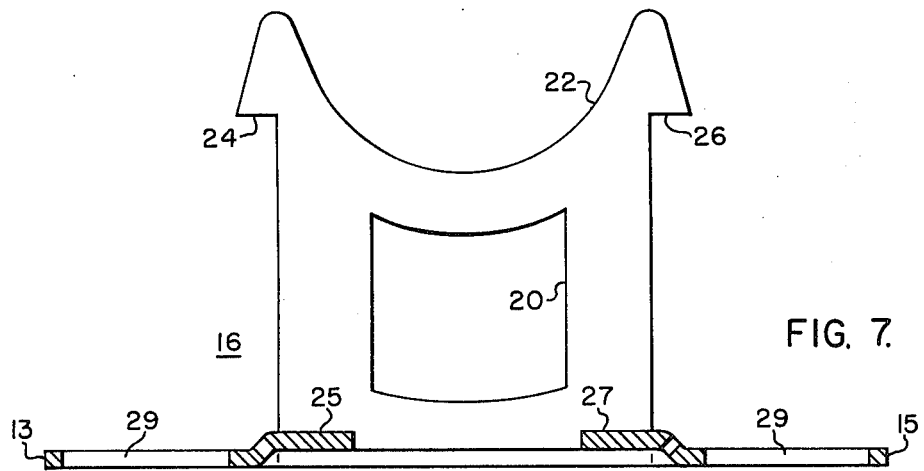
FIG. 7 is a sectional view of the base plate member of FIG. 6 taken along the line VII—VII.
Figure 11:
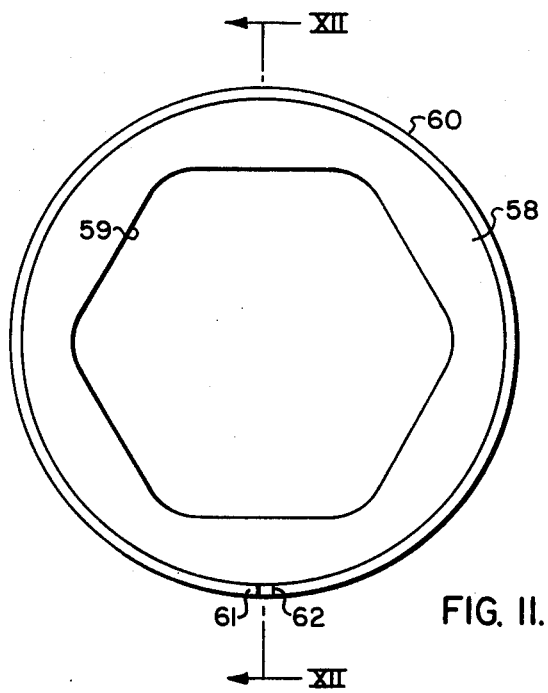
FIG. 11 is an elevation view of a resilient annulus.
Figure 12:
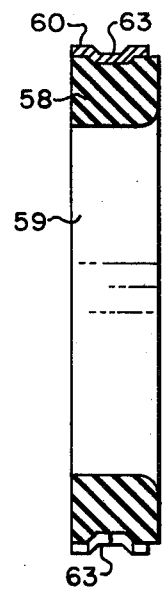
FIG. 12 is a side view, in section, of the resilient annulus of FIG. 11 taken along the line XII—XII.
Figure 13:
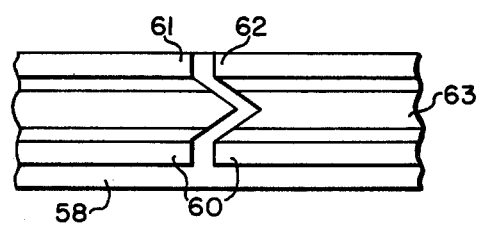
FIG. 13 is an enlarged view of a split collar arrangement for the resilient annulus of FIG. 12.

The motor 40 is shown supported by the invention in a resilient mounting arrangement in FIG. 3 of the drawing. A resilient connection is made between the yokes 12, 14 and the hexagonal hub mounting portions 54 by means of an annulus 58 of resilient material. The resilient annulus 58, illustrated in FIGS. 11 and 12, comprises a ring of resilient material having an inner periphery with complementary portions 59 for engagement with the axially projecting hexagonal hub mounting portion 54, and a substantially circular outer periphery. A stiffening collar 60 circumscribes the circular outer periphery of the resilient annulus 59. As shown in FIGS. 12 and 13, the collar 60 has radially spaced, split end portions 61, 62 and a circumferential groove 63 which is disposed in a conventional manner to prevent rupture of the resilient annulus 59. The collar 60 is preferably formed of stainless steel and the resilient annulus 59 is constructed from a material such as rubber which resists deformation substantially linearly. When mounted in operating position, the collar 60 is engaged by the clamp 30 and the lip 22 in a compressive union.

Conversion of the mounting of the motor 40 from a rigid arrangement to a resilient arrangement is accomplished in the present invention by expanding the axial displacement of the base plate members 16, 18 until the yokes 12, 14 are in axial alignment with the hexagonal hub mounting portions 54. The resilient annulus 58 is pressed over the hexagonal periphery of the hub mounting portion 54 on the shaft end of the motor 40. The resilient annulus 58 and the collar 60 are held in compressive engagement with the curved lip 22 by the arcuate fastening straps 32, 34 which are tightened together by the screw 38 and nut 39.

It is apparent that a motor can be mounted either rigidly or resiliently on the mounting base provided by the present invention simply by expanding or contracting the telescoping base plate members for alignment with the proper hub mounting portions. The adjustable mounting structure also has a further advantage of accommodating motors of different axial lengths.

These advantages are important to the user because of the simplicity and versatility associated with the various configurations which are possible. Long range production savings to the manufacturer are possible because a greater number of identical units can be produced, and inventories can be reduced.

While the principles of the invention have been illustrated in connection with an electric motor, it should be understood that the invention is also applicable to generators, pumps, and other rotating machinery. It is apparent that various modifications may be made to the illustrated embodiments without departing from the scope of the invention; therefore, the invention is not limited to the specific construction shown, but includes equivalent embodiments.

What is claimed is:

1. In combination, a dynamoelectric machine and a mounting base therefore, said dynamoelectric machine including an axially projecting end bell having first and second hub mounting portions;

said mounting base including first and second interlocking base portions slidably engaged one with another to permit expansion and contraction of the axial length of said mounting base, and a yoke carried by one of said interlocking base portions;

said first base portion having two shoulder members projecting therefrom and a tongue portion disposed between said shoulder members; and, said second base portion having two shoulder members projecting therefrom and two channel members disposed between said shoulder members, said shoulder members of said first and second base portions being arranged in an overlapping relationship and said tongue portion being engaged in sliding contact with said channel members;

the axial length of said mounting base being adjustable to permit alignment of said yoke with a selected one of said hub mounting portions; and, means securing said yoke to said selected one of said hub mounting portions.

2. The combination defined in claim 1, said shoulder members of said first and second base portions having a plurality of slots extending therethrough and being spaced according to a predetermined pattern, selected ones of said slots being concentrically disposed and engaged by fastening means.

3. The combination defined in claim 1, said yoke securing means comprising a pair of arcuate fastening straps, said straps each having one end portion secured to said yoke, the remaining end portions being secured one to another.

4. The combination defined in claim 1, said first and second hub mounting portions being disposed in generally tandem concentric relation with respect to one another on said end bell, said first mounting portion having a polygonal periphery and said second mounting portion having a curved periphery.

5. The combination defined in claim 4, including an annulus of resilient material having an inner periphery with complementary portions for engaging the polygonal projections of said first hub mounting portion, the axial length of said mounting base being adjusted to align said yoke with said first hub mounting portion, said annulus being disposed intermediate said first hub mounting portion and said yoke securing means to provide a resilient mounting arrangement for said dynamoelectric machine.

6. The combination as defined in claim 5, including an annular stiffening collar circumscribing the outer periphery of said annulus, said collar being circumferentially grooved and having radially spaced, split end portions, said collar being disposed intermediate said resilient annulus and said yoke securing means.

7. The combination defined in claim 4, the axial length of said mounting base being adjusted to align said yoke with said second hub mounting portion, and wherein said securing means circumscribes the curved periphery of said second hub mounting portion in a compressive union therewith to provide a rigid mounting arrangement for said dynamoelectric machine.

* * * * *